*Light-divider only.*
June 22, 1926.  C. R. LORD  1,589,761
PROJECTOR FOR MOVING PICTURE MACHINES
Filed July 21, 1924
T2686
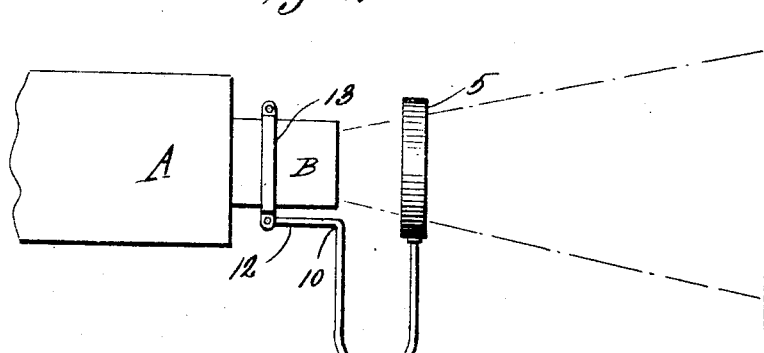
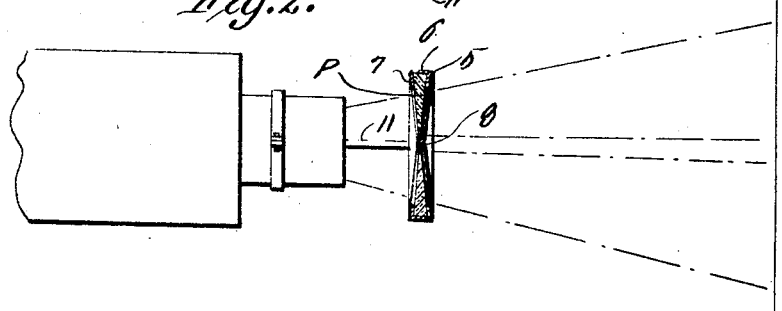
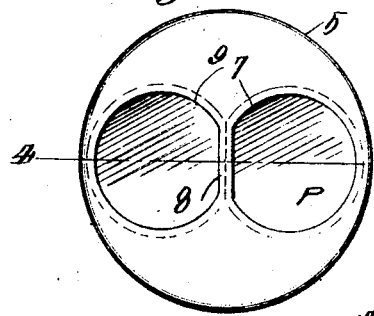
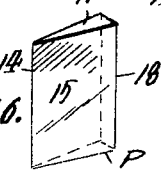
WITNESSES
Inventor
CHESTER R. LORD
By Richard B. Owen
Attorney

38. OPTICS,

Patented June 22, 1926.

1,589,761

UNITED STATES PATENT OFFICE.

CHESTER R. LORD, OF MINERAL CITY, OHIO.

PROJECTOR FOR MOVING-PICTURE MACHINES.

Application filed July 21, 1924. Serial No. 727,370.

The present invention appertains to a projector designed particularly for use in moving picture projecting means but of course may be used with any other light projecting machines.

The principal object of the invention is to provide a device of this nature which may be utilized in conjunction with a projecting machine so that two pictures may be projected simultaneously alongside of each other on the same screen. Of course the two pictures will be identical.

Another important object of the invention is to provide a holder for two prismatic lenses in order that they may be held side by side in front of the lens of a projecting machine.

A still further object of the invention is to provide a double projector of this nature which is possessed of a very simple construction, one which will be efficient and reliable in operation, inexpensive to manufacture, and well adapted to the purpose for which it is designed.

With the above and numerous other objects in view as will appear as the description progresses, the invention resides in certain novel features of construction, and in the combination and arrangement of parts as will be hereinafter more fully described and claimed.

In the drawing:

Figure 1 is a fragmentary elevation of the projecting box of a motion picture projecting machine showing my invention associated therewith, Figure 2 is a top plan view thereof showing the projector in section, Figure 3 is a plan view of the projector, Figure 4 is a section therethrough taken on the line 4—4 of Figure 3, Figure 5 is a detail perspective of one of the prismatic lenses, and Figure 6 is a similar view showing a modified form thereof.

Referring to the drawing in detail it will be seen that A designates the projector of an ordinary moving picture machine which is provided with the lens holder of conventional construction. My projector includes a frame 5 which is of circular construction including the annular band 6 which forms the edge for connecting the plates 7 which are so constructed that their center portions 8 are disposed so as to touch each other. These plates 7 are provided with openings 9 one on each side of the center strips 8. A bracket 10 is designed for holding the frame in front of the lens of the lens holder B and is constructed with a U-shaped body 11 one end of which is fixed to the frame 5 and the other end of which is provided with an extension 12 fixed to a clamp 13 adapted to be disposed about the lens holder B.

Triangular prismatic lenses P are disposed within the frame 5 one on each side of the center strips 8. These triangular prismatic lenses P are provided with knife edges 14 and retracting surfaces 15 diverging from each other from said knife edges 14. In Figure 5 the prismatic lens is shown with a semi-circular edge 16 besides the knife edge 14 but in the modification shown in Figure 6 the prismatic lens is provided with the two triangular shaped edges 17 and the rectangular edge 18. The knife edges 14 are disposed adjacent the center strips 8 of the frame. This center strip extends vertically when the device is in operation and the picture projection from the machine will be doubled and shown twice on the screen alongside of each other as indicated to advantage in Figure 2. These lenses P may be formed of ordinary glass or of any other material from which lenses may be made.

Although I have described the invention with a certain degree of particularity, it is evident that changes in the details of construction in the combination and arrangement of parts may be resorted to without departing from the spirit or scope of the invention as hereinafter claimed or sacrificing any of its advantages.

Having thus described my invention, what I claim as new is:

A projector of the character described including a circular frame embodying a pair of opaque plates having their outer edges rigidly connected by an annular band and provided with two pairs of registering openings in side by side relation, said plates having contiguous vertical center strips between the pairs of openings, a pair of prismatic lenses disposed and rigidly held between the plates in side by side relation and coincident with said pairs of openings, a bracket rigid with said frame, and a clamp carried by the bracket engageable with the lens holder of a projecting machine to removably mount the projector in front of the lens holder in the path of a beam of light projected through the latter, whereby a single image from the projecting machine will be displayed in duplicate and in side by side relation on a single screen.

In testimony whereof I affix my signature.

CHESTER R. LORD.